United States Patent
Cai et al.

(10) Patent No.: US 10,536,405 B2
(45) Date of Patent: Jan. 14, 2020

(54) AUTOMATICALLY DETERMINING AND SELECTING A SUITABLE COMMUNICATION CHANNEL TO DELIVER MESSAGES TO RECIPIENT

(71) Applicant: International Business Machines Corporation, Armonk, NY (US)

(72) Inventors: Xiang Cai, Beijing (CN); Yan Fen Guo, Beijing (CN); Dong Rui Li, Beijing (CN); Xiao Jian Lian, Beijing (CN); Cheng Fang Wang, Beijing (CN); Hong Dong Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 15/811,079

(22) Filed: Nov. 13, 2017

(65) Prior Publication Data
US 2019/0149491 A1    May 16, 2019

(51) Int. Cl.
*H04L 12/58* (2006.01)

(52) U.S. Cl.
CPC ............. *H04L 51/04* (2013.01); *H04L 51/16* (2013.01); *H04L 51/36* (2013.01)

(58) Field of Classification Search
CPC .......... H04L 51/04; H04L 51/16; H04L 51/36
USPC .................................. 709/206, 217
See application file for complete search history.

(56) References Cited

U.S. PATENT DOCUMENTS

| 8,880,627 | B2 | 11/2014 | Davenport et al. |
| 8,918,085 | B2* | 12/2014 | Lew .................. H04L 29/12896 455/414.1 |
| 2003/0023691 | A1* | 1/2003 | Knauerhase ............ H04L 51/04 709/206 |
| 2005/0132057 | A1 | 6/2005 | Bresnan et al. |

(Continued)

FOREIGN PATENT DOCUMENTS

CN        103067247 A        4/2013

OTHER PUBLICATIONS

IP.COM, "System and Method for Communication Channel Preference Management," IP.COM Disclosure No. IPCOM000220168D, https://priorart.ip.com/IPCOM/000220168, Jul. 24, 2012, pp. 1-2.

(Continued)

*Primary Examiner* — Zi Ye
(74) *Attorney, Agent, or Firm* — Robert A. Voigt, Jr.; Winstead, P.C.

(57) ABSTRACT

A method, system and computer program product for processing messages sent to a recipient. The communication channel used to send the message is identified, where such a communication channel is not currently being used by the recipient. After identifying the communication channel(s) currently being used by the recipient, the contact information of users who have previously communicated with the recipient using the communication channel(s) currently being used by the recipient are analyzed. The message is then marked with the identity of the sender as well as the communication channel used by the sender after matching the contact information of the sender with the contact (Continued)

information of a user who had previously communicated with the recipient using the communication channel(s) currently being used by the recipient. The marked message is then sent to the recipient using a communication channel currently being used by the recipient.

20 Claims, 5 Drawing Sheets

(56) References Cited

U.S. PATENT DOCUMENTS

| | | | |
|---|---|---|---|
| 2009/0028183 A1 | 1/2009 | Landers et al. | |
| 2011/0179126 A1* | 7/2011 | Wetherell | H04L 51/36 709/206 |
| 2012/0089698 A1* | 4/2012 | Tseng | G06Q 10/101 709/217 |
| 2013/0041956 A1* | 2/2013 | Davenport | H04L 51/14 709/206 |
| 2013/0218870 A1* | 8/2013 | Bukurak | H04M 1/72522 707/722 |
| 2014/0075375 A1 | 3/2014 | Hwang et al. | |
| 2016/0359780 A1 | 12/2016 | Green et al. | |

OTHER PUBLICATIONS

IP.COM, "Routing a Message to a Recipient Preferred Communication Medium Based on Historical Data," IP.COM Disclosure No. IPCOM000242036D, https://priorart.ip.com/IPCOM/000242036, Jun. 15, 2015, pp. 1-2.

* cited by examiner

AUTOMATICALLY DETERMINING AND SELECTING A SUITABLE COMMUNICATION CHANNEL TO DELIVER MESSAGES TO RECIPIENT

TECHNICAL FIELD

The present invention relates generally to communications, and more particularly to automatically determining and selecting a suitable communication channel to deliver messages to the recipient.

BACKGROUND

Currently, it is common for a user to utilize multiple communication channels (e.g., e-mail, instant messaging, social media, text messaging, blogging) using various applications, such as WeChat®, Slack®, Sametime®, Twitter®, etc. However, users typically can only use one or two communication channels at the same time. As a result, messages that are sent to the recipient via other communication channels that are not currently being used by the recipient may not be received by the recipient until the recipient opens that communication channel. Consequently, the recipient may not be able to receive such messages in a timely manner.

Furthermore, users may search for messages on the current open communication channel where those messages are actually located on a different communication channel, including a non-active communication channel. As a result, the user may not be able to locate such messages.

Additionally, users may forget which communication channel was previously used to communicate with a particular user due to the increasing number of communication channels available to the user.

As a result, there is not currently a means for effectively processing messages on different communication channels, including those not currently being used by the recipient, in such a manner that allows the recipient to receive such messages in a timely manner. Furthermore, there is not currently a means for allowing users to effectively locate messages on different communication channels as well as to assist the user in communicating with another user via an appropriate communication channel, including previously used communication channels.

SUMMARY

In one embodiment of the present invention, a method for processing messages sent to a recipient over communication channels comprises receiving a message directed to the recipient. The method further comprises identifying a first communication channel used to send the message, where the first communication channel is not currently being used by the recipient. The method additionally comprises determining contact information of a sender of the message using the first communication channel. Furthermore, the method comprises identifying a second communication channel currently being used by the recipient. Additionally, the method comprises analyzing, by a processor, contact information of users who have previously communicated with the recipient using the second communication channel. In addition, the method comprises matching, by the processor, the contact information of the sender with contact information of a user who had previously communicated with the recipient using the second communication channel. The method further comprises marking, by the processor, the message with an identifier of the sender and an identifier of the first communication channel. The method additionally comprises sending the marked message to the recipient using the second communication channel.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for processing messages sent to a recipient over communication channels. In one embodiment of the present invention, messages directed to a recipient are received. The communication channel used to send the message is identified, where such a communication channel is not currently being used by the recipient. As used herein, a "communication channel" refers to a means of communicating, such as e-mail, instant messaging, social media, text messaging, blogging, etc., using various applications, such as WeChat®, Slack®, Sametime®, Twitter®, etc. For example, a communication channel may be established between the WeChat® server and a user. Furthermore, the contact information (e.g., name, phone number) of the sender of the message is then determined, such as by analyzing the received message. After identifying the communication channel(s) currently being used by the recipient, the contact information of users who have previously communicated with the recipient using the communication channel(s) currently being used by the recipient are analyzed. After matching the contact information of the sender with the contact information of a user who had previously communicated with the recipient using the communication channel(s) currently being used by the recipient, the message is then marked with the identity of the sender as well as the communication channel used by the sender to send the message. The marked message is then sent to the recipient using a communication channel currently being used by the recipient. In this manner, messages that would have previously been unprocessed, such as those messages sent to a communication channel not currently being used by the recipient, can now be processed by sending them to a communication channel currently being used by the recipient. As a result, the recipient will be able to receive such messages in a timely manner.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
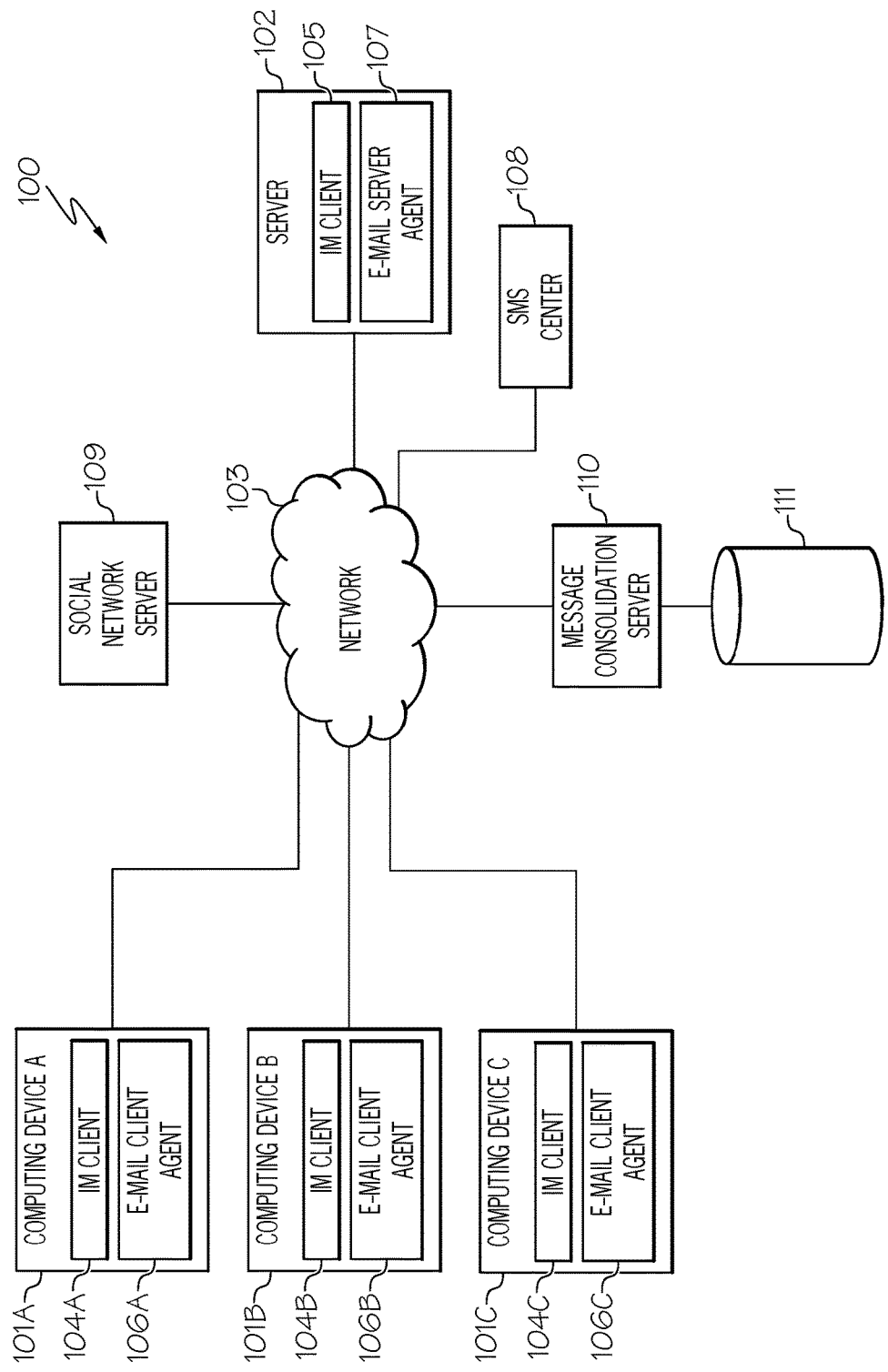
FIG. 1 illustrates a communication system for practicing the principles of the present invention in accordance with an embodiment of the present invention.

Referring now to the Figures in detail, FIG. 1 illustrates a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a server 102 via a network 103. Computing devices 101A-101C may collectively or individually be referred to as computing devices 101 or computing device 101, respectively. The user of computing device 101 may also be referenced herein as user 101.

Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other computing devices 101 and server 102.

Computing devices 101 may be configured to send and receive text-based messages, such as in real-time during an instant messaging session. Any user of computing device 101 may be the creator or initiator of an instant message (message in instant messaging) and any user of computing device 101 may be a recipient of an instant message. Furthermore, any user of computing device 101 may be able to create, receive and send e-mails. Additionally, any user of computing device 101 may be able to send and receive text messages, such as Short Message Services (SMS) messages. The term "messages," as used herein, encompasses each of these types of messages as well as posts to social media websites, such as Facebook®, forums, wikis, etc.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, computing devices 101A-101C include a software agent, referred to herein as an Instant Messaging (IM) client 104A-104C, respectively. Instant messaging clients 104A-104C may collectively or individually be referred to as instant messaging clients 104 or instant messaging client 104, respectively. Furthermore, server 102 includes a software agent, referred to herein as the Instant Messaging (IM) server 105. IM client 104 provides the functionality to send and receive instant messages. As messages are received, IM client 104 presents the messages to the user in a dialog window (or IM window). Furthermore, IM client 104 provides the functionality for computing device 101 to connect to the IM server 105 which provides the functionality of distributing the instant messages to the IM clients 104 associated with each of the sharing users.

Computing device 101A-101C may further include a software agent, referred to herein as an e-mail client agent 106A-106C, respectively. E-mail client agents 106A-106C may collectively or individually be referred to as e-mail client agents 106 or e-mail client agent 106, respectively. Furthermore, server 102 may include a software agent, referred to herein as the e-mail server agent 107. E-mail client agent 106 enables the user of computing device 101 to create, send and receive e-mails. E-mail server agent 107 is configured to receive e-mail messages from computing device 101 and distribute the received e-mail messages among the one or more computing devices 101.

While the preceding discusses each computing device 101 as including an IM client 104 and an e-mail client agent 106, each computing device 101 may not necessarily include each of these software agents. Furthermore, while the preceding discusses a single server 102 including the software agents, such as IM server 105 and e-mail server agent 107, multiple servers may be used to implement these services. Furthermore, each server 102 may not necessarily be configured to include all of these software agents, but only a subset of these software agents.

System 100 further includes a Short Message Service (SMC) center 108 configured to relay, store and forward text messages, such as SMS messages, among computing devices 101 through network 103.

System 100 further includes a social network server 109, which may be a web server configured to offer a social networking and/or microblogging service, enabling users of computing devices 101 to send and read other users' posts. "Posts," as used herein, include any one or more of the following: text (e.g., comments, sub-comments and replies), audio, video images, etc. Social network server 109 is connected to network 103 by wire or wirelessly. While FIG. 1 illustrates a single social network server 109, it is noted for clarity that multiple servers may be used to implement the social networking and/or microblogging service.

System 100 further includes a message consolidation server 110 connected to network 103 via wire or wirelessly. As discussed further below, message consolidation server 110 is configured to effectively process messages on different communication channels (means of communication, such as via different applications), including those not currently being used by the recipient of such messages, in such a manner that allows the recipient to receive such messages in a timely manner. That is, message consolidation server 110 is configured to automatically determine and select a suitable communication channel to deliver messages to the recipient. Furthermore, as discussed further below, message consolidation server 110 allows users to effectively locate messages on different communication channels such as by searching on different communication channels that match the provided search criteria. Additionally, as discussed further below, message consolidation server 110 assists the user in communicating with another user via an appropriate communication channel, such as by reviewing the past history of communications between the user and other users as well as by reviewing the user preferences provided by the user. In one embodiment, the past history of communications between the user (e.g., user 101A) and other users (e.g., users 101B, 101C) are monitored by message consolidation server 110 and stored in database 111 connected to message consolidation server 110. In one embodiment, the user (e.g., user 101A) provides preferences to message consolidation server 110 as to which communication channel should be used to communicate with particular users (e.g., user 101B). Such preferences may be stored in database 111. Furthermore, in one embodiment, database 111 stores contact information (e.g., name, phone number, e-mail address) of users who have previously communicated with the user.

System 100 is not to be limited in scope to any one particular network architecture. System 100 may include any number of computing devices 101, servers 102, networks 103, SMS centers 108, social network servers 109, message consolidation servers 110 and databases 111. Furthermore, while FIG. 1 illustrates message consolidation server 110 as being a separate physical device, some or all of the functionality of message consolidation server 110, as discussed herein, may reside in computing device 101.

Figure 2:
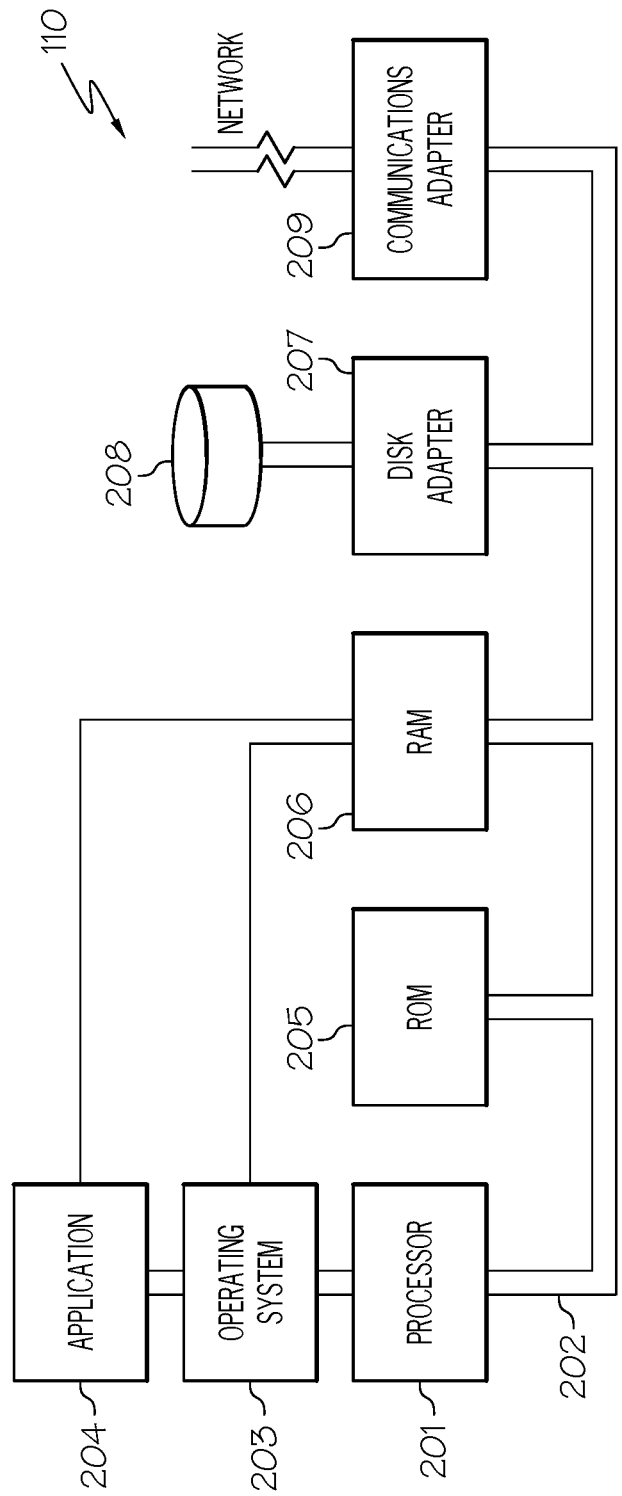
FIG. 2 illustrates an embodiment of the present invention of a hardware configuration of the message consolidation server which is representative of a hardware environment for practicing the present invention.

Referring now to FIG. 2, FIG. 2 illustrates an embodiment of the present invention of a hardware configuration of message consolidation server 110 (FIG. 1) which is representative of a hardware environment for practicing the present invention. Referring to FIG. 2, message consolidation server 110 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for effectively processing messages on different communication channels, including those not currently being used by the recipient of such messages, in such a manner that allows the recipient to receive such messages in a timely manner, as discussed further below in connection with FIGS. 3 and 4A-4B. Furthermore, application 204 may include, for example, a program for searching on different communication channels for messages that match provided search criteria as discussed further below in connection with FIGS. 3 and 5.

Referring again to FIG. 2, read-only memory ("ROM") 205 is coupled to system bus 202 and includes a basic input/output system ("BIOS") that controls certain basic functions of message consolidation server 110. Random access memory ("RAM") 206 and disk adapter 207 are also coupled to system bus 202. It should be noted that software components including operating system 203 and application 204 may be loaded into RAM 206, which may be message consolidation server's 110 main memory for execution. Disk adapter 207 may be an integrated drive electronics ("IDE") adapter that communicates with a disk unit 208, e.g., disk drive. It is noted that the program for effectively processing messages on different communication channels, including those not currently being used by the recipient of such messages, in such a manner that allows the recipient to receive such messages in a timely manner, as discussed further below in connection with FIGS. 3 and 4A-4B, may reside in disk unit 208 or in application 204. Furthermore, the program for searching on different communication channels for messages that match provided search criteria, as discussed further below in connection with FIGS. 3 and 5, may reside in disk unit 208 or in application 204.

Message consolidation server 110 further includes a communications adapter 209 coupled to bus 202. Communications adapter 209 interconnects bus 202 with an outside network (e.g., network 103 of FIG. 1) thereby allowing message consolidation server 110 to communicate with other devices, such as computing devices 101, server 102, SMS center 108 and social network server 109.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, it is common for a user to utilize multiple communication channels (e.g., e-mail, instant messaging, social media, text messaging, blogging) using various applications, such as WeChat®, Slack®, Sametime®, Twitter®, etc. However, users typically can only use one or two communication channels at the same time. As a result, messages that are sent to the recipient via other communication channels that are not currently being used by the recipient may not be received by the recipient until the recipient opens that communication channel. Consequently, the recipient may not be able to receive such messages in a timely manner. Furthermore, users may search for messages on the current open communication channel where those messages are actually located on a different communication channel, including a non-active communication channel. As a result, the user may not be able to locate such messages. Additionally, users may forget which communication channel was previously used to communicate with a particular user due to the increasing number of communication channels available to the user. As a result, there is not currently a means for effectively processing messages on different communication channels, including those not currently being used by the recipient, in such a manner that allows the recipient to receive such messages in a timely manner. Furthermore, there is not currently a means for allowing users to effectively locate messages on different communication channels as well as to assist the user in communicating with another user via an appropriate communication channel, including previously used communication channels.

Figure 3:
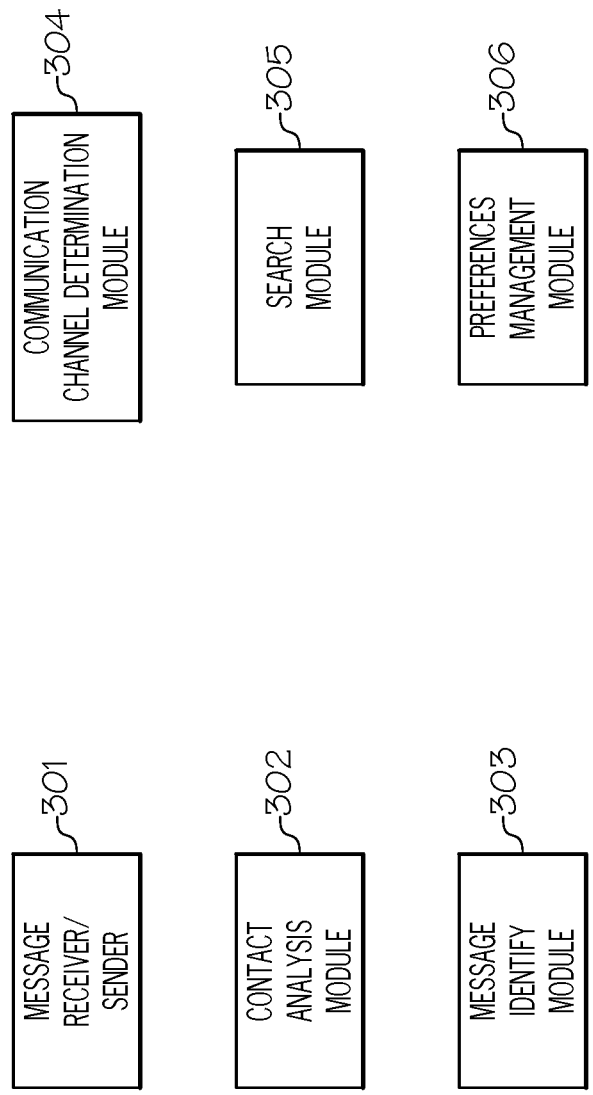
FIG. 3 is a diagram of the software components of the message consolidation server used to effectively process messages on different communication channels as well as to allow users to effectively locate messages on different communication channels as well as to assist the user in communicating with another user via an appropriate communication channel in accordance with an embodiment of the present invention.
Figure 4A:
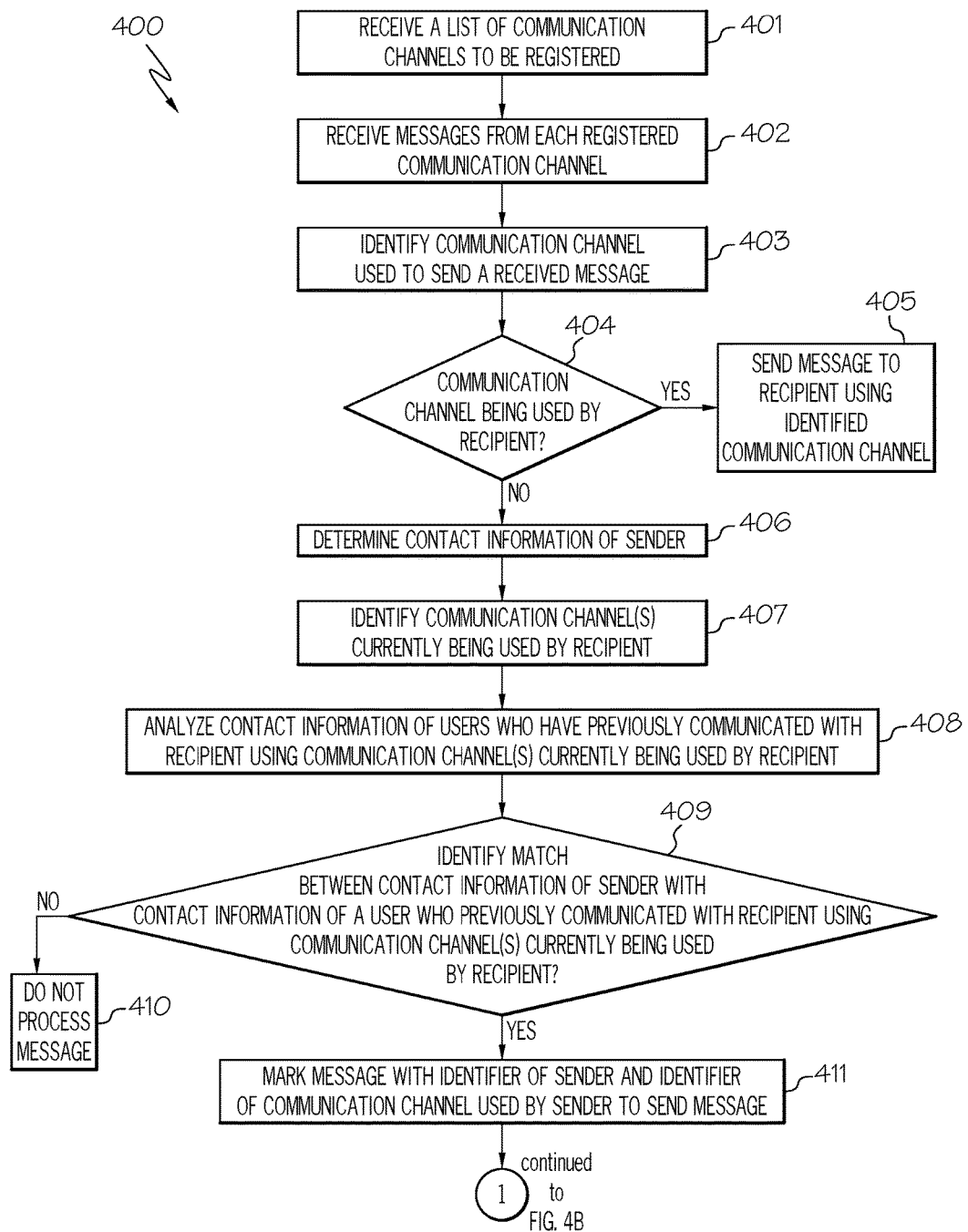
FIGS. 4A-4B are a flowchart of a method for effectively processing messages on different communication channels in accordance with an embodiment of the present invention.
Figure 4B:
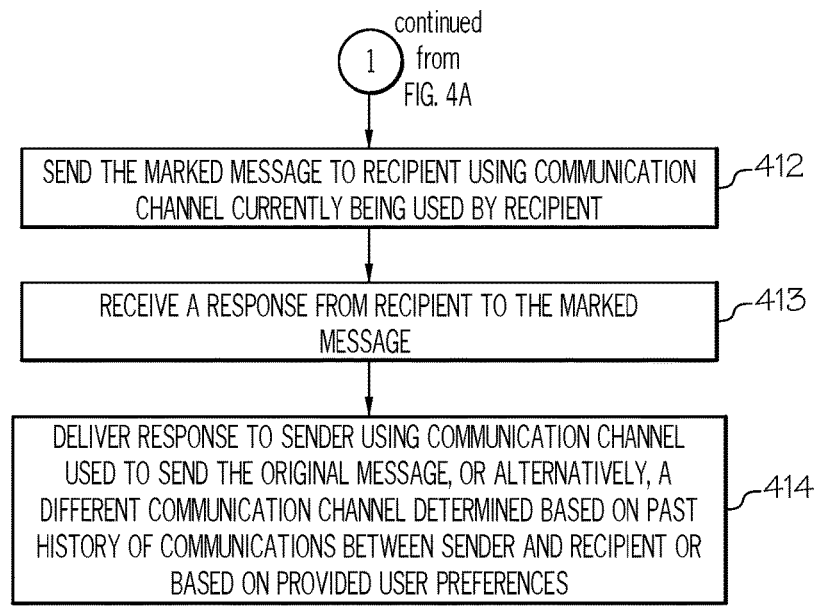
Figure 5:
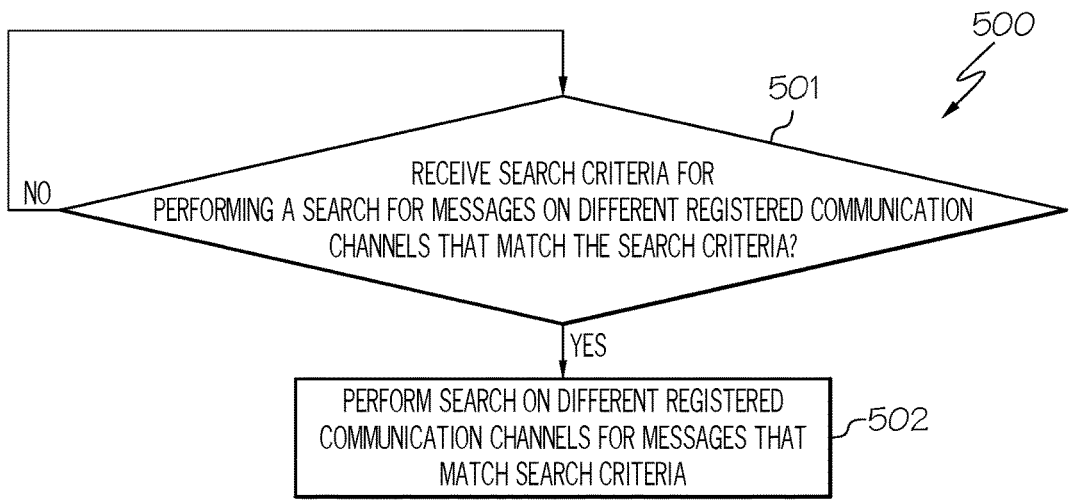
FIG. 5 is a flowchart of a method to effectively locate messages on different communication channels in accordance with an embodiment of the present invention.

The principles of the present invention provide a means for effectively processing messages on different communication channels, including those not currently being used by the recipient, in such a manner that allows the recipient to receive such messages in a timely manner as discussed below in connection with FIGS. 3, 4A-4B and 5. Furthermore, the principles of the present invention allow users to effectively locate messages on different communication channels as well as to assist the user in communicating with another user via an appropriate communication channel, including previously used communication channels as discussed below in connection with FIGS. 3, 4A-4B and 5. FIG. 3 is a diagram of the software components of message consolidation server 110 used to effectively process messages on different communication channels as well as to allow users to effectively locate messages on different communication channels as well as to assist the user in communicating with another user via an appropriate communication channel. FIGS. 4A-4B are a flowchart of a method for effectively processing messages on different communication channels. FIG. 5 is a flowchart of a method to effectively locate messages on different communication channels.

As stated above, FIG. 3 is a diagram of the software components of message consolidation server 110 used to effectively process messages on different communication channels as well as to allow users to effectively locate messages on different communication channels as well as to assist the user in communicating with another user via an appropriate communication channel in accordance with an embodiment of the present invention. In one embodiment, these software components may reside in application 204 (FIG. 2) of message consolidation server 110.

The following provides a brief description of these software components. A more detailed description of these software components (including their functionalities) is provided below in conjunction with FIGS. 4A-4B and 5.

Referring to FIG. 3, in conjunction with FIGS. 1-2, message consolidation server 110 includes a message receiver/sender 301 configured to receive messages from communication channels registered by user 101 with message consolidation server 110. As used herein, a "communication channel" refers to a means of communicating, such as e-mail, instant messaging, social media, text messaging, blogging, etc. using various applications, such as WeChat®, Slack®, Sametime®, Twitter®, etc. For example, a communication channel may be established between the WeChat® server and a user (e.g., user of computing device 101A). To be clear, different communication channels may include communicating using the same basis (e.g., text messaging) but with different applications. Hence, in one embodiment, user 101 may provide a list of communication channels to message consolidation server 110 to be registered by providing a list of various software applications. In one embodiment, message receiver/sender 301 is configured to only receive those messages from those communication channels that have been registered with message consolidation server 110.

Furthermore, message receiver/sender 301 is configured to send messages, including delivering received messages to the recipient as well as delivering responses from the recipient to the senders of the original messages.

Message consolidation server 110 further includes a contact analysis module 302 configured to analyze a message received by message receiver/sender 301 to determine the contact information (e.g., name, phone number, e-mail address) of the sender of the message (also referred to herein as simply the "sender"). In one embodiment, user 101 may upload his/her contacts to message consolidation server 110 to be used by contact analysis module 302 to determine the sender of the message. In one embodiment, contact analysis module 302 determines the contact information of the sender from the application used by the sender to send the message.

Furthermore, contact analysis module 302 is configured to analyze the contact information of users who have previously communicated with the recipient (recipient of the message from the sender is referred to herein as the "recipient"), including those communication channels not currently being used by the recipient. Such information (contact information of users who have previously communicated with the recipient) may be stored in database 111. After analyzing the contact information of users who have previously communicated with the recipient, a determination is made by contact analysis module 302 as to whether there is match between the contact information of the sender and the contact information of a user who had previously communicated with the recipient using communication channel(s) currently being used by the recipient.

Additionally, in one embodiment, contact analysis module 302 is configured to merge all messages from the same sender (identified by contact analysis module 302), whether sent on the same communication channel or different communication channels, including non-active communication channels, to be delivered to the recipient via a particular active communication channel. "Non-active" communication channels refer to communication channels not currently being used by the recipient of the message from the sender. "Active" communication channels refer to communication channels currently being used by the recipient of the message from the sender.

Message consolidation server 110 additionally includes a message identify module 303 configured to identify the communication channel used by the sender to send a message, such as identifying the application (e.g., WeChat®) used by the sender to send the message. Furthermore, message identify module 303 is configured to mark the message with the identity of the sender as well as the communication channel used by the sender to send the message.

Furthermore, message consolidation server 110 includes a communication channel determination module 304 configured to analyze the current communication channel(s) being utilized by the recipient (e.g., user 101A) of the message from the sender (e.g., user 101B) and to determine whether the sender's message delivered on a non-active communication channel can be delivered to the recipient using one of the active communication channels. That is, if the recipient is using multiple active communication channels, communication channel determination module 304 determines which of these active communication channels the sender's message should be delivered. In one embodiment, such a determination is based on the user's preferences, such as stored in database 111. For example, the user may specify that all messages from Lucy are to be delivered in the WeChat® communication channel when it is active. In another embodiment, such a determination is made based on the past history of communications between the sender and the recipient, which is stored in database 111. For example, if the sender and the recipient typically text message each other using WeChat®, then communication channel determination module 304 determines that the sender's message should be delivered to the recipient using the WeChat® communication channel if the WeChat® communication channel is active.

Additionally, communication channel determination module 304 is configured to determine which communication channel should be used to deliver the recipient's response to the sender's message, such as using the communication channel that was used by the sender. In one embodiment, communication channel determination module 304 makes such a determination based on the past history of communications between the sender and the recipient, which is stored in database 111. For example, if the sender and the recipient typically text message each other using WeChat®, then communication channel determination module 304 determines that the recipient's response should be delivered to the sender using the WeChat® communication channel.

Furthermore, in one embodiment, communication channel determination module 304 makes the determination as to which communication channel should be used to deliver the recipient's response to the sender's message based on user preferences provided by user 101, which may be stored in database 111. For example, the user (e.g., user 101A) may specify that messages sent to a particular user (e.g., user 101B) are to be delivered over designated communication channels. For instance, the user (e.g., user 101A) may provide message consolidation server 110 the contact information of designated users (e.g., user 101B) who are only to receive messages over designated communication channels (e.g., WeChat® communication channel).

Additionally, message consolidation server 110 includes a search module 305 configured to search the different communication channels registered by the user (e.g., user 101A)

that match search criteria provided by the user. For example, the user may request message consolidation server 110 to identify any messages involving the hockey team Detroit Red Wings® that were sent over any of the registered communication channels (whether active or not) over a user-designated period of time (e.g., last two hours).

Furthermore, message consolidation server 110 includes a preferences management module 306 configured to manage the preferences provided by the user (e.g., user 101A). For example, as discussed above, the user may provide preferences as to which communication channel should be used to communicate with a designated user. Such preferences may be stored in database 111 and managed by preferences management module 306.

Using these software components, message consolidation server 110 effectively processes messages on different communication channels, including those not currently being used by the user, as discussed below in connection with FIGS. 4A-4B.

FIGS. 4A-4B are a flowchart of a method 400 for effectively processing messages on different communication channels, including those not currently being used by the user, in accordance with an embodiment of the present invention.

Referring to FIG. 4A, in conjunction with FIGS. 1-3, in step 401, message consolidation server 110 receives a list of communication channels to be registered by a user (e.g., user 101A). In step 402, message consolidation server 110 (message receiver/sender 301) receives messages directed to a recipient (e.g., user 101A) (recipient of the message from the sender is referred to herein as the "recipient") from each registered communication channel, including those communication channels not currently being used by the recipient (non-active communication channels). As used herein, a "communication channel" refers to a means of communicating, such as e-mail, instant messaging, social media, text messaging, blogging, etc. using various applications, such as WeChat®, Slack®, Sametime®, Twitter®, etc. For example, a communication channel may be established between the WeChat® server and a user, such as the recipient of the message. In one embodiment, user 101 may provide a list of communication channels to message consolidation server 110 to be registered by providing a list of various software applications. In one embodiment, message receiver/sender 301 is configured to only receive those messages from those communication channels that have been registered with message consolidation server 110.

In step 403, message consolidation server 110 (message identify module 303) identifies the communication channel used to send a received message, such as identifying the application (e.g., WeChat®) used by the sender to send the message (also referred to herein as simply the "sender").

In step 404, a determination is made by message consolidation server 110 as to whether the identified communication channel is being used by the recipient. If the identified communication channel is being used by the recipient, then, in step 405, message consolidation server 110 sends the message to the recipient using the identified communication channel.

If, however, the identified communication channel is not currently being used by the recipient, then in step 406, message consolidation server 110 (contact analysis module 302) determines the contact information (e.g., name, phone number) of the sender, such as by analyzing the sent message. For example, the IP address of the message may be obtained from the header of the message. The IP address may then be associated with a particular user based on previous communications from that user. For instance, the recipient of a message may have previously indicated to message consolidation server 110 that messages from this particular IP address correspond to messages from a designated user (e.g., user 101B). Such information may be stored in database 111. In another example, the phone number of the text message may be obtained, where the phone number may be associated with a user's name, where such information may be stored in database 111. For example, the recipient of a text message may have previously indicated that the phone number of the sender of the text message corresponds to a designated user (e.g., user 101B).

In one embodiment, once the sender is identified, contact analysis module 302 may merge all the messages sent from the same sender to be delivered to the same recipient so as to all be delivered to the recipient using a particular active communication channel as discussed herein. In one embodiment, contact analysis module 302 may merge messages sent from the same sender across multiple communication channels, including non-active communication channels.

In step 407, message consolidation server 110 (contact analysis module 302) identifies the communication channel(s) currently being used by the recipient. For example, contact analysis module 302 may identify the communication channel of Slack® as currently being used by the recipient.

In step 408, message consolidation server 110 (contact analysis module 302) analyzes the contact information of users who have previously communicated with the recipient using the communication channel(s) currently being used by the recipient. Such contact information may be stored in database 111, such as based on prior communications with such users.

In step 409, a determination is made by message consolidation server 110 (contact analysis module 302) as to whether there is a match between the contact information of the sender with the contact information of a user who had previously communicated with the recipient using the communication channel(s) currently being used by the recipient.

If there is not a match between the contact information of the sender with the contact information of any user who previously communicated with the recipient using the communication channel(s) currently being used by the recipient, then, in step 410, message consolidation server 110 does not process the message. The message is not processed since it cannot be determined that the sender had previously communicated with the recipient, and hence, cannot be established that the recipient would potentially be interested in receiving such a message.

If, however, there is match between the contact information of the sender with the contact information of a user who had previously communicated with the recipient using the communication channel(s) currently being used by the recipient, then, in step 411, message consolidation server 110 (message identify module 303) marks the message with the identity of the sender as well as the communication channel used by the sender to send the message. For example, suppose that Emily sent the text message using the WeChat® application. Suppose further that the recipient is currently using the Slack® application. Message consolidation server 110 will then analyze the contacts of the Slack® application. If a match is found, such as locating a telephone number of a Slack® contact (contact for Wang Fang) that matches the telephone number of the sender (Emily), then it may be inferred that Emily and Wang Fang are the same individuals. As a result, the sender's message is marked with the communication channel used to send the message (e.g., WeChat®) and Emily's identifier. For example, suppose that the message sent by Emily was "Hi Steven, let's go play tennis this afternoon." The message may then be modified by message identify module 303 as "[WeChat® Emily] Hi Steven, let's go play tennis this afternoon." While the foregoing discusses an example of a single message, the principles of the present invention apply to marking multiple messages, including messages sent from the same sender that were merged as discussed above.

Referring to FIG. 4B, in conjunction with FIGS. 1-3, in step 412, message consolidation server 110 (message receiver/sender 301) sends the marked message to the recipient using the communication channel (e.g., Slack® channel) currently being used by the recipient. For example, the message discussed above may be sent to Steven in Slack® using Wang Fang's account. In this manner, messages that would have previously been unprocessed, such as those messages sent to a communication channel not currently being used by the recipient, can now be processed by sending them to the communication channel currently being used by the recipient. The recipient will now be able to immediately see the message and respond to it. By marking such messages with the identity of the sender and the communication channel used by the sender, the recipient will be able to identify who sent the message as well as which communication channel was used by the sender. While the foregoing discusses an example of a single message, the principles of the present invention apply to sending multiple messages to an active communication channel, including messages sent from the same sender that were merged as discussed above.

Furthermore, in one embodiment, if the recipient is using multiple active communication channels, communication channel determination module 304 determines which of these active communication channels the sender's message should be delivered. In one embodiment, such a determination is based on the user's preferences, such as stored in database 111. For example, the user may specify that all messages from Lucy are to be delivered in the WeChat® communication channel when it is active. In another embodiment, such a determination is made based on the past history of communications between the sender and the recipient, which is stored in database 111. For example, if the sender and the recipient typically text message each other using WeChat®, then communication channel determination module 304 determines that the sender's message should be delivered to the recipient using the WeChat® communication channel if the WeChat® communication channel is active.

In this manner, the present invention provides a means for effectively processing messages on different communication channels, including those not currently being used by the recipient, in such a manner that allows the recipient to receive such messages in a timely manner. That is, the technical problem of not receiving messages in a timely manner when sent on communication channels not currently being used by the recipient is addressed by the present invention. As discussed above, the present invention provides a technological solution to the technical problem by processing messages on inactive communication channels so that such messages can be delivered to the recipient on active communication channels.

In step 413, message consolidation server 110 (message receiver/sender 301) receives a response from the recipient to the marked message.

In step 414, message consolidation server 110 (message receiver/sender 301) delivers the response to the sender using the communication channel used to send the original message (e.g., WeChat® communication channel), or alternatively, a different communication channel determined based on the past history of communications between the sender and the recipient or based on the provided user preferences. In this manner, the present invention provides assistance to the user to communicate with another user via an appropriate communication channel. That is, the technical problem of determining which communication channel to use to send a message, such as a previously used communication channel (e.g., users may forget which communication channel was previously used to communicate with a particular user due to the increasing number of communication channels available to the user), is addressed by the present invention. As discussed above, the present invention provides a technological solution to the technical problem by assisting the user in automatically selecting an appropriate communication channel to deliver messages, such as a response to a received message.

In one embodiment, the particular communication channel to send the response (including the communication channel used by the sender) may be determined based on the past history of communications between the sender and the recipient, which is stored in database 111. For example, if the sender and the recipient typically text message each other using WeChat®, then communication channel determination module 304 determines that the recipient's response should be delivered to the sender using the WeChat® communication channel.

Furthermore, in one embodiment, the particular communication channel to send the response (including the communication channel used by the sender) may be determined based on user preferences provided by user 101, which may be stored in database 111. For example, the user (e.g., user 101A) may specify that messages sent to a particular user (e.g., user 101B) are to be delivered over designated communication channels. For instance, the user (e.g., user 101A) may provide message consolidation server 110 the contact information of designated users (e.g., user 101B) who are only to receive messages over designated communication channels (e.g., WeChat® communication channel).

Additionally, message consolidation server 110 may receive a search request from the user to identify any messages on any registered communication channel that matches the search criteria as discussed below in connection with FIG. 5.

FIG. 5 is a flowchart of a method 500 to effectively locate messages on different communication channels in accordance with an embodiment of the present invention.

Referring to FIG. 5, in conjunction with FIGS. 1-3 and 4A-4B, in step 501, a determination is made by message consolidation server 110 (search module 305) as to whether it received search criteria for performing a search for messages on different registered communication channels (those channels registered by the user) that match the search criteria provided by the user.

If message consolidation server 110 (search module 305) did not receive search criteria for performing a search for messages on different registered communication channels by the user, then message consolidation server 110 (search module 305) continues to determine whether it received search criteria for performing a search for messages on different registered communication channels in step 501.

If, however, message consolidation server 110 (search module 305) received search criteria for performing a search for messages on different registered communication channels that match the search criteria provided by the user, then, in step 502, message consolidation server 110 (search module 305) performs a search on different registered communication channels for messages that match the search criteria provided by the user. For example, the user may request message consolidation server 110 to identify any messages involving the hockey team Detroit Red Wings® that were sent over any of the registered communication channels (whether active or not) over a user-designated period of time (e.g., last two hours).

In this manner, users can now effectively locate messages on different communication channels. That is, the present invention provides a technological solution to the technical problem in locating messages on communication channels by searching for messages on different communication channels, including those inactive, that match the search criteria provided by the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for processing messages sent to a recipient over communication channels, the computer program product comprising a computer readable storage medium having program code embodied therewith, the program code comprising the programming instructions for:
   receiving a list of communication channels to be registered, wherein each of said communication channels is associated to a corresponding software application;
   receiving a message directed to said recipient;
   identifying a first communication channel from said list of registered communication channels used to send said message, wherein said first communication channel is not currently being used by said recipient;
   determining contact information of a sender of said message using said first communication channel;
   identifying a second communication channel from said list of registered communication channels currently being used by said recipient;
   analyzing contact information of users who have previously communicated with said recipient using said second communication channel;
   matching said contact information of said sender with contact information of a user who had previously communicated with said recipient using said second communication channel;
   marking said message with an identifier of said sender and an identifier of said first communication channel by inserting said identifier of said sender and said identifier of said first communication channel into said message; and
   sending said marked message to said recipient using said second communication channel.

2. The computer program product as recited in claim 1, wherein the program code further comprises the programming instructions for:
   receiving a response from said recipient to said marked message using said second communication channel.

3. The computer program product as recited in claim 2, wherein the program code further comprises the programming instructions for:
   delivering said response to said sender using said first communication channel.

4. The computer program product as recited in claim 2, wherein the program code further comprises the programming instructions for:
   reviewing past history of communications between said sender of said message and said recipient to determine which communication channel said response should be delivered to said sender.

5. The computer program product as recited in claim 2, wherein the program code further comprises the programming instructions for:
   receiving user preferences for means of communicating with other users; and
   reviewing said user preferences to determine which communication channel said response should be delivered to said sender.

6. The computer program product as recited in claim 1, wherein the program code further comprises the programming instructions for:
   receiving messages from each registered communication channel.

7. The computer program product as recited in claim 1, wherein the program code further comprises the programming instructions for:
   receiving search criteria to be used to perform a search for messages on different communication channels that match said search criteria.

8. The computer program product as recited in claim 1, wherein the program code further comprises the programming instructions for:
   determining said contact information of said sender of said message by analyzing said message; and
   obtaining an IP address of said message from a header of said message, wherein said IP address is associated with a name of said sender based on previous communications said recipient had with said sender.

9. The computer program product as recited in claim 1, wherein the program code further comprises the programming instructions for:
   determining said contact information of said sender of said message by analyzing said message, wherein said message is a text message; and
   obtaining a phone number from said text message, wherein said phone number is associated with a name of said sender based on said recipient previously indicating that said phone number is associated with said name of said sender.

10. The computer program product as recited in claim 1, wherein the program code further comprises the programming instructions for:
    identifying said sender based on said contact information of said sender; and
    merging all messages sent from said sender to be delivered to said recipient using said second communication channel.

11. A system, comprising:
    a memory unit for storing a computer program for processing messages sent to a recipient over communication channels; and
    a processor coupled to the memory unit, wherein the processor is configured to execute the program instructions of the computer program comprising:

receiving a list of communication channels to be registered, wherein each of said communication channels is associated to a corresponding software application;

receiving a message directed to said recipient;

identifying a first communication channel from said list of registered communication channels used to send said message, wherein said first communication channel is not currently being used by said recipient;

determining contact information of a sender of said message using said first communication channel;

identifying a second communication channel from said list of registered communication channels currently being used by said recipient;

analyzing contact information of users who have previously communicated with said recipient using said second communication channel;

matching said contact information of said sender with contact information of a user who had previously communicated with said recipient using said second communication channel;

marking said message with an identifier of said sender and an identifier of said first communication channel by inserting said identifier of said sender and said identifier of said first communication channel into said message; and sending said marked message to said recipient using said second communication channel.

12. The system as recited in claim 11, wherein the program instructions of the computer program further comprise:

receiving a response from said recipient to said marked message using said second communication channel.

13. The system as recited in claim 12, wherein the program instructions of the computer program further comprise:

delivering said response to said sender using said first communication channel.

14. The system as recited in claim 12, wherein the program instructions of the computer program further comprise:

reviewing past history of communications between said sender of said message and said recipient to determine which communication channel said response should be delivered to said sender.

15. The system as recited in claim 12, wherein the program instructions of the computer program further comprise:

receiving user preferences for means of communicating with other users; and reviewing said user preferences to determine which communication channel said response should be delivered to said sender.

16. The system as recited in claim 11, wherein the program instructions of the computer program further comprise:

receiving messages from each registered communication channel.

17. The system as recited in claim 11, wherein the program instructions of the computer program further comprise:

receiving search criteria to be used to perform a search for messages on different communication channels that match said search criteria.

18. The system as recited in claim 11, wherein the program instructions of the computer program further comprise:

determining said contact information of said sender of said message by analyzing said message; and obtaining an IP address of said message from a header of said message, wherein said IP address is associated with a name of said sender based on previous communications said recipient had with said sender.

19. The system as recited in claim 11, wherein the program instructions of the computer program further comprise:

determining said contact information of said sender of said message by analyzing said message, wherein said message is a text message; and obtaining a phone number from said text message, wherein said phone number is associated with a name of said sender based on said recipient previously indicating that said phone number is associated with said name of said sender.

20. The system as recited in claim 11, wherein the program instructions of the computer program further comprise:

identifying said sender based on said contact information of said sender; and merging all messages sent from said sender to be delivered to said recipient using said second communication channel.

* * * * *